Aug. 29, 1944.　　　C. H. DUCKETT　　　2,356,835
TAPERED SLEEVE OR SOCKET FOR DRILLS AND OTHER TAPERED SHANK TOOLS
Filed April 10, 1943　　　2 Sheets-Sheet 1

Inventor
Cecil H. Duckett

By Clarence A. O'Brien
and Harvey B. Jacobson
Attorneys

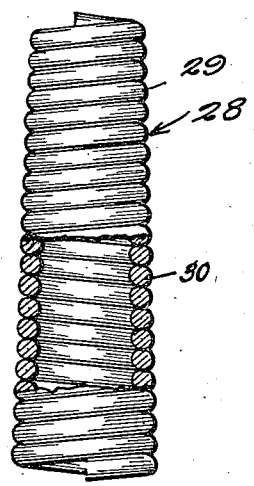
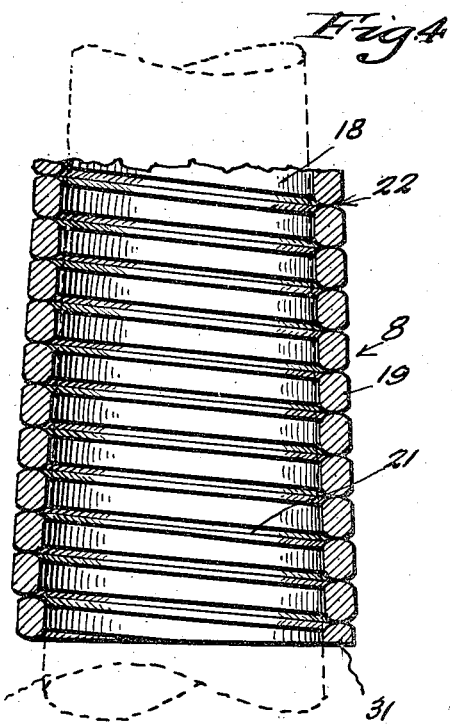
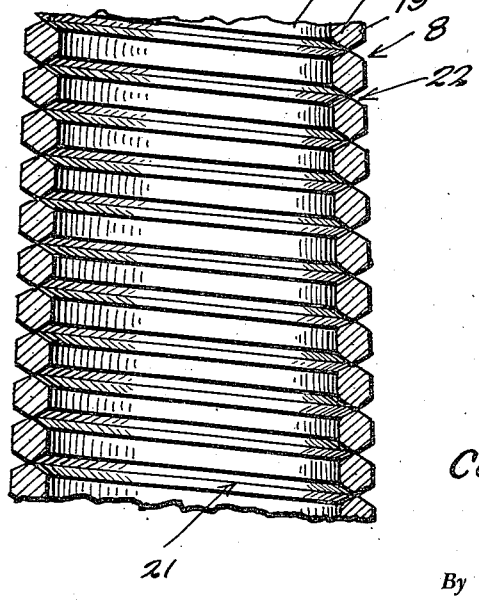
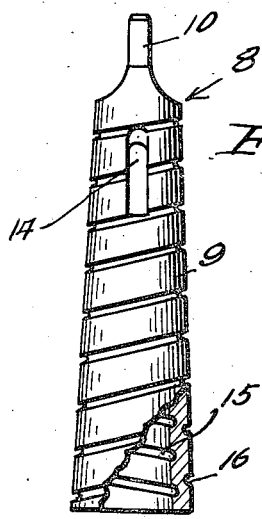

Patented Aug. 29, 1944

2,356,835

UNITED STATES PATENT OFFICE 2,356,835

TAPERED SLEEVE OR SOCKET FOR DRILLS AND OTHER TAPERED SHANK TOOLS

Cecil H. Duckett, Brooklyn, N. Y.

Application April 10, 1943, Serial No. 482,636

2 Claims. (Cl. 77—55)

This invention relates broadly to tapered shank tools such as drills, reamers, etc., but has more specific reference to a novel and improved tapered socket or sleeve, for example, a tapered sleeve in the form of a tapered shell equipped for removable reception in the tapered socket of a lathe spindle or equivalent tapered holder or driver, as the case may be.

The conventional tapered drill sleeve such as is now adapted and generally used to telescopically and frictionally receive the tapered shank of the drill or equivalent tool is a precision part and great care is exercised in its manufacture to insure perfect fit of taper shank tools. At its solid or closed end the sleeve is provided with a reduced driving tang, the principal part relied upon to couple it with its holder or driving spindle. Adjacent the tang it is provided with diametrically opposite slots ordinarily designed to accommodate a somewhat standardized drift or center key such as is used for "drifting" a drill out of its socket in such a way as to prevent injury to the tang.

These sockets, drift keys and the like are subject to rough usage and handling by mechanics and machinists and are not, therefore, maintained in the best of condition. Under present prevailing practices, the tang on the tapered shank of the drill has positive driving connection with the sleeve and the tang on the sleeve has mechanical positive driving connection with the spindle or other part holding said sleeve. The coacting tapers between parts provide the frictional properties and requirements essential to a certain transmission of power between said respective parts. In some instances, under present day drilling procedures, the drill is held stationary and the work turns, while in other instances the work is fixed and the drill, which is pressed constantly and pregressivly thereagainst, turns to thus obtain the desired feeding and drilling results.

As a result of studied consideration of the performance of tapered sleeves and tapered drill sockets, I have brought into being a new type of tapered socket which, it is believed, more adequately and satisfactorily fulfills the requirements of the manufacturer and user.

In reducing to practice the principles of my invention I have achieved a number of goals. Of outstanding importance is the provision of a new type tapered socket which instead of being in the form of an imperforate walled shell, is of convolved form, the convolutions being such as to radially contract and bind and frictionally grip the tapered shank of the drill, or other tools, so that the turning of the shank in relation to the embracing convolutions binds the latter more tightly and thus provides a positive frictional driving fit between the shank and the socket, the socket being jammed into the lathe tool holder to frictionally lodge itself in the latter socket, whereby to provide a friction coupling and driving connection between the shank of the tool and the sleeve holding part in an obvious manner.

Another feature of the invention has to do with the adoption and use of a drill or other tools susceptible of quantity production manufacture from preferably steel wire fashioned into a tapered coil and precision ground or machined to flatten the convex surfaces of the coils, when round wire is used, to thus present the desired flattened surfaces to the sleeve driving spindle and shank of the tool, in the desired manner.

Another feature of the invention has reference to the use of a convolute resilient tapered sleeve or socket of a self-tightening type which when removed from the spindle in conjunction with the tool is such that a slight twist of the sleeve and tool in directions opposite to each other almost immediately releases the tool and disengages said parts. Resilient coils in a sleeve of this type also coordinate their functions in the sense that the frictional gripping of the shank in the sleeve or socket is from end to end, thus making the frictional tension result coextensive with that part of the shank embraced by the coils.

Novelty is also predicated on a tapered sleeve of the type under advisement in which the convolutions or coils may be of varying cross-sectional shapes and dimensions, the thought being that they should be preferably polygonal so that there will be grooves on the outer as well as inner driving faces, said grooves to serve as clearance and accommodation pockets for cuttings, extraneous particles and matter, on worn and damaged machine spindles.

It is also an object and within the purview of this invention to improve upon the solid shell type of sleeve by forming in the inner and outer surfaces spiraling grooves functioning as clearance pockets as just described.

The foregoing is not intended to constitute a comprehensive recital of all features and advantages involved. As a matter of fact, other features and advantages will become more evident from the following description and the accompanying illustrative drawings.

In the drawings, wherein like refrence numerals designate like parts throughout the views:

Figure 4 is a view similar to Figure 2 showing the outermost coil or convolution retracted in diameter to obtain the initial bite, this in accordance with my ideas.

Figure 5 is a view partly in elevation and partly in section showing the round spring wire coiled to provide the first step in the construction of the sleeve.

Figure 6 is also a fragmentary longitudinal sectional view, this to show the possibility of using convolutions of hexagonal cross sectional form.

Figure 7 is an elevational view of the ordinary or regular drill sleeve having external and internal grooves for clearing purposes.

Figures 1, 2, 3:
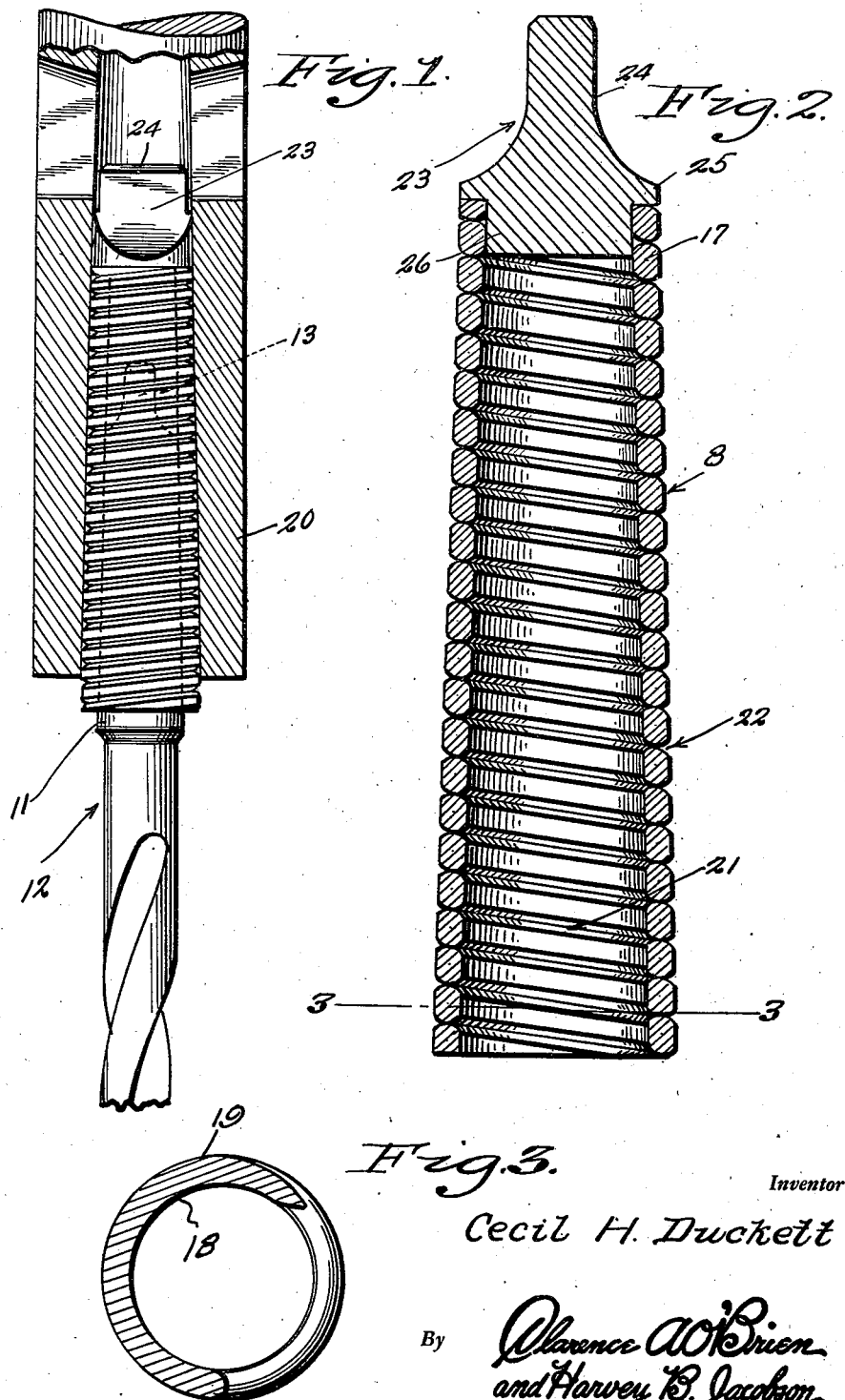
Figure 1 is a view partly in section and partly in elevation showing the apertured spindle with the improved convolved tool sleeve or adapter socket fitted frictionally and telescopically therein.
Figure 2 is an enlarged longitudinal section through the sleeve per se showing the coils or convolutions having their interior and exterior surfaces flattened.
Figure 3 is a section taken on the plane of the line 3—3 of Figure 2.

By way of introduction to the detailed description, it will be observed that the structures seen in Figures 1, 2, 3, 4 and 6 pertain to the preferred embodiment of the invention. Figure 5 is illustrative of one aspect of the method phase of the invention. Figure 7, though somewhat secondarily shown, is nevertheless an outstanding adaptation of one phase of the invention. The figures will be systematically referred to in order to bring out the inventive ideas to best advantage.

Attention is first directed to Figure 2, which depicts the essence of the invention and which is self-inclusive to a point sufficient to enable the reader to gather the principal points of invention involved. Now, to begin with, it is to be noted that we are concerned primarily with a part or accessory which is sometimes referred to as a sleeve and other times as a tool socket. More specifically, the type with which we are here concerned is the "tapered" socket. This is referred to, as a unit, by the numeral 8. As indicated in the introductory portion of the description, the conventional socket or sleeve is like the one shown in Figure 7, this distinguished by the numeral 8a. It is, as presently constructed and made, in the form of a properly tapered shell 9 having an integral tang 10 at its inner or closed end. The opposite or mouth end is adapted to receive the conventional tapered shank 11 carried by the tool 12 (see Fig. 1). This shank 11 is almost invariably provided with an integral driving tang 13. Although the part 12 is referred to broadly as a taper shank tool, it is shown, in the instant manner, in the form of a twist drill. In practice it fits tightly into the shell 9 and is essentially driven by a connection between the tang 13 and a keyway (not shown) in the shell. Also, and as is well known in the trade, the tank 13 projects into the area of the sleeve or shell which is provided with diametrically opposite slots 14, said slots to accommodate a drift pin (not shown). It is to be observed in this connection that although I show, in Figure 7, the conventional sleeve or shell having slots and tang, the slots are entirely eliminated in the improved sleeve 8. As a matter of fact, the friction driving result which is attainable with my improved sleeve is such that it is possible to dispense with the tang as well. However, I have shown the tang to completely portray the invention.

It may be stated at this point that the primary purpose in showing the construction illustrated in Figure 7 is to accomplish several things. First, it facilitates the description of the old or so-called solid wall sleeve commonly employed in the trade. However, the essential purpose is to provide two additional features on this so-called "old" sleeve. These are the inner and outer spiraling grooves 15 and 16, whose purposes and advantages will be brought out more satisfactorily after the description of Figure 2 is completed.

Reference being had again to Figure 2, it will be seen that the very essence of the invention is in the provision of a convolved sleeve. Now, it is within the purview of the invention to simply utilize one coil, that is, to have a sleeve whose outer end is formed into a single convolution susceptible of providing the frictional driving coupling between the tool shank and the sleeve. However, it is far more feasible and practicable to have the convolutions or coils extending from end to end of the sleeve in order to provide a frictional grip which is commensurate with the entire portion of the shank which fits within the sleeve. Each coil added beyond the aforementioned "single coil" idea contributes just that much additional gripping surface and fortifies the drive coupling between parts. So, it is evident that the sleeve is provided with a plurality of nested or abutting coils 17. It will be noted that these convolutions or coils have flattened inner shank contacting and gripping surfaces 18 and corresponding flattened outer surfaces 19, the latter surfaces contacting the wall of the socket in the tool holder 20 seen in Figure 1. In addition, it is to be observed that the machining and flattening of the coils provides inner and outer spiraling pockets or grooves 21 and 22. As previously touched upon, these grooves are for clearance purposes. It is evident that debris in the form of scale and worn-away metal particles, resulting from wear and tear of the parts between each other, can accumulate in these grooves and thus provide a refined and finished driving fit at all times.

As before stated, it is not absolutely essential to use a tang on this coiled tapered spirally grooved sleeve. However, it is generally desirable to have this part included. In the drawings in Figure 2 it is identified by the numeral 23. The tang 24 is conventional and is mounted on the body which includes a flange 25 abutting the adjacent or innermost coil. Then there is a plug portion 26 telescoping into the adjacent two coils. Screwing the plug into the coils causes the coils to tighten and provide a dependable frictional coupling between the tank and the adjacent end of the sleeve.

The coils can be substantially rectangular, as shown in Figure 2, or hexagonal, as shown in Figure 6. Or they may be of any other polygonal shape to provide the desired radial expansible and contractible result and flattened surfaces for frictionally gripping the tool shank.

Reference being had now to Figure 5, this shows an unfinished sleeve. Here we see a tapered coiled spring 28 whose coils 29 are closely nested together in spiral order. It is the purpose of this particular figure to bring out the fact that it is within the purview of the method phase of the invention to employ a tubular tapered coil spring of this sort and to machine down the inner and outer diametrically opposite convex or crown portions 30, so that they take the appearance seen, for example, in Figures 2, 3, 4 and 6. As stated before, it is within the purview of this invention to utilize a sleeve of the coil spring type shown in Figure 5 whether the convolutions or coils are flattened or not. It is evident, however, that flattening the inner and outer faces, as at 18 and 19 in Figure 3, provides for better frictional and functional properties. However, it is my desire to comprehend both forms, and, incidentally, a coiled sleeve of the type indicated at 28 provides not only a shank embracing friction socket, but the annular spiraling grooves between the respective coils provide the aforementioned pockets. It is, of course, desirable to have the pockets more acute, as shown at the points 21 and 22 in Figure 2. However, these are matters of degrees and proportions which are not to be construed as needlessly restrictive.

It is also a factor worth while to mention that, as shown for example in Figure 4, the outermost convolution or coil 31 may be slightly more restricted than the next succeeding coil to increase the intensity of the grip on the shank at this point.

Considering now the different phases of the inventive concept as comprehended in the various views singly and collectively, I desire to stress that there is no need in the tapered coiled socket for slots, such as for example the slots 14 in Figure 7. This is true because once the tool and socket is slipped out of the tool holder 20, the turning of the parts in directions opposite to each other, which is done by a twist of the wrist, the parts can be expeditiously separated and put away in their proper racks. Further, it is not essential, as before indicated, to employ the shank unit or member 23. This is, therefore, not to be construed as a needless limitation. Furthermore, and as before touched upon, I believe that I am the first in the art to employ internal and external spiraling grooves 15 and 16, as brought out in Figure 7, this being an improvement on the existing type of slotted tang equipped sleeve or socket.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

What is claimed is:

1. As a new article of manufacture, a resilient tapered longitudinally elongated sleeve adapted for reception therein of the tapered shank of a tool to be frictionally embraced and driven thereby, said sleeve being adapted to fit telescopically into a conventional lathe or equivalent tool or drill holder and being made up of spiralling, radially expansible and retractible tool shank embracing coils, said coils having diametrically opposed flattened shank gripping friction surfaces for limited contact with the shank and lathe drill holder, respectively, the inner and outer perimeter edges being beveled and the bevels coacting and defining spiralling V-shaped channels existing between the respective coils, and the end and outermost coil being of a normal diameter less than the diameter of the next adjacent coil for initially embracing and tightening around the shank to thus more effectively contract and bind all of the succeeding coils around said shank in the manner and for the purposes described.

2. As a new article of manufacture, a resilient tapered longitudinally elongated sleeve adapted for reception therein of the tapered shank of a tool to be frictionally embraced and driven thereby, said sleeve being adapted to fit telescopically into a conventional lathe or equivalent tool or drill holder and being made up of spiralling, radially expansible and retractible tool shank embracing coils, said coils having diametrically opposed flattened shank gripping friction surfaces for limited contact with the shank and lathe drill holder, respectively, the inner and outer perimeter edges being beveled and the adjacent bevels coacting and defining spiralling V-shaped channels existing between the respective coils, and the end and outermost coil being of a normal diameter less than the diameter of the next adjacent coil for initially embracing and tightening around the shank to thus more effectively contract and bind all of the succeeding coils around said shank in the manner and for the purposes described, together with a detachable tang embodying a shouldered head, said head including a flange abutting the adjacent innermost coil, and a plug protruding into said inner end and bridging the adjacent channels to facilitate retention of said tang in place.

CECIL H. DUCKETT.